United States Patent
Matsuzaki et al.

(10) Patent No.: US 12,292,740 B2
(45) Date of Patent: May 6, 2025

(54) MOBILE OBJECT CONTROL DEVICE, MOBILE OBJECT, LEARNING DEVICE, LEARNING METHOD, AND STORAGE MEDIUM

(71) Applicant: HONDA MOTOR CO., LTD., Tokyo (JP)

(72) Inventors: Sango Matsuzaki, Wako (JP); Yuji Hasegawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 17/952,406

(22) Filed: Sep. 26, 2022

(65) Prior Publication Data
US 2023/0098219 A1  Mar. 30, 2023

(30) Foreign Application Priority Data
Sep. 30, 2021 (JP) ................. 2021-162069

(51) Int. Cl.
*G05D 1/00* (2024.01)

(52) U.S. Cl.
CPC ......... *G05D 1/0214* (2013.01); *G05D 1/0221* (2013.01); *G05D 1/0223* (2013.01); *G05D 1/0238* (2013.01)

(58) Field of Classification Search
CPC ............................ G05D 1/0214; G05D 1/0221
USPC .......................................................... 701/26
See application file for complete search history.

(56) References Cited

U.S. PATENT DOCUMENTS

| | | | | |
|---|---|---|---|---|
| 2009/0327011 | A1* | 12/2009 | Petroff | G08G 1/202 705/5 |
| 2010/0222954 | A1* | 9/2010 | Ichinose | G05D 1/0246 700/255 |
| 2021/0191404 | A1 | 6/2021 | Blake et al. | |
| 2022/0055215 | A1 | 2/2022 | Hasegawa et al. | |
| 2022/0196414 | A1* | 6/2022 | Wang | G05B 13/027 |
| 2022/0397900 | A1 | 12/2022 | Kurose et al. | |

FOREIGN PATENT DOCUMENTS

| | | |
|---|---|---|
| CN | 113253733 | 8/2021 |
| JP | 2019-106114 | 6/2019 |
| JP | 2021-077286 | 5/2021 |
| WO | 2020/136977 | 7/2020 |

OTHER PUBLICATIONS

Semnani et al., "Multi-agent motion planning for dense and dynamic environments via deep reinforcement learning", IEEE Robotics and Automation Letters, 5(2):3221-3226, 2020.
Long et al., "Towards optimally decentralized multi-robot collision avoidance via deep reinforcement learning", 2018 IEEE International Conference on Robotics and Automation (ICRA).
Japanese Office Action for Japanese Patent Application No. 2021-162069 mailed on Jul. 23, 2024.
Japanese Office Action for Japanese Patent Application No. 2021-162069 mailed Jan. 7, 2025.

* cited by examiner

*Primary Examiner* — Todd Melton
*Assistant Examiner* — Vincent Feng
(74) *Attorney, Agent, or Firm* — Amin, Turocy & Watson, LLP

(57) ABSTRACT

A mobile object control device includes a route determiner configured to determine a route of a mobile object according to the number of obstacles existing around the mobile object; and a controller configured to move the mobile object along the route determined by the route determiner.

12 Claims, 8 Drawing Sheets

MODEL LEARNED WITH TWO AGENTS

MODEL LEARNED UP TO TEN AGENTS

MOBILE OBJECT CONTROL DEVICE, MOBILE OBJECT, LEARNING DEVICE, LEARNING METHOD, AND STORAGE MEDIUM

CROSS-REFERENCE TO RELATED APPLICATION

Priority is claimed on Japanese Patent Application No. 2021-162069, filed Sep. 30, 2021, the content of which is incorporated herein by reference.

BACKGROUND

Field of the Invention

The present invention relates to a mobile object control device, a mobile object, a learning device, a learning method, and a storage medium.

Description of Related Art

In recent years, attempts have been made to determine a moving route of a mobile object by artificial intelligence (AI) generated by machine learning. Reinforcement learning in which an action is determined based on an observation value, and a reward based on feedback obtained from an actual environment or a simulator is calculated to optimize model parameters is also being studied and put into practical use.

In this regard, there is disclosed an invention of a route determination device configured to determine a route when an autonomous mobile robot moves to a destination under a condition that a traffic participant including a pedestrian exists in a traffic environment to the destination in order to take a safe and secure avoidance behavior with respect to movement of people (PCT International Publication No. WO 2020/136977 A). The route determination device includes a predicted route determiner configured to determine a predicted route that is a predicted value of a route of the robot so as to avoid interference between the robot and the traffic participant using a predetermined prediction algorithm, and a route determiner configured to determine a route of the robot using a predetermined control algorithm so that an objective function including a distance to the traffic participant closest to the robot and a speed of the robot as independent variables becomes a maximum value when it is assumed that the robot moves from a current position along the predicted route.

The following Document 1 describes multi-stage training for performing reinforcement learning while increasing the number of agents in a stepwise manner for distributed motion planning in a dense and dynamic environment.

The following Document 2 describes a multi-scenario multi-stage training framework as a method of learning a policy capable of appropriately determining the operation of the mobile object.

(Document 1) Samaneh Hosseini Semnani, Hugh Liu, Michael Everett, Anton de Ruiter, and Jonathan P How. "Multi-agent motion planning for dense and dynamic environments via deep reinforcement learning." IEEE Robotics and Automation Letters, 5(2): 3221-3226, 2020.
(Document 2) P. Long, T. Fan, X. Liao, W. Liu, H. Zhang, and J. Pan. Towards optimally decentralized multi-robot collision avoidance via deep reinforcement learning. In 2018 IEEE International Conference on Robotics and Automation (ICRA).

SUMMARY

However, in the conventional method, as a result of learning an environment where more mobile objects exist to cope with a complicated environment, over-learning occurs, and an inappropriate moving route may be determined in an environment where there are few mobile objects. As described above, in the related art, the moving route cannot be appropriately determined according to the congestion degree of the environment.

The present invention has been made in view of such circumstances, and an object of the present invention is to provide a mobile object control device, a mobile object, a learning device, a learning method, and a storage medium capable of determining an appropriate movement mode according to the congestion degree of the environment.

A mobile object control device, a mobile object, a learning device, a learning method, and a storage medium according to the present invention adopted the following configuration.

(1) A mobile object control device according to one aspect of the present invention includes a route determiner configured to determine a route of a mobile object according to the number of obstacles existing around the mobile object; and a controller configured to move the mobile object along the route determined by the route determiner.

(2) In the above aspect (1), the route determiner determines a route of the mobile object based on a policy of an operation learned by a simulator and a learning part, the policy of the operation being learned by the simulator simultaneously executing a simulation of an operation of the mobile object and the obstacle for a plurality of environments having different numbers of obstacles, and the learning part updating so as to maximize a reward obtained by applying a reward function to the processing result of the simulator.

(3) In the above aspect (2), the policy of the operation is learned based on processing results of a plurality of the simulators, the number of obstacles in the environment being different for each of the plurality of the simulators, and the learning part learning by updating the policy of the operation so that an accumulated sum of the rewards obtained by applying a reward function to each processing result of the plurality of the simulators is maximized.

(4) A mobile object according to one aspect of the present invention includes any one of the mobile object control devices described above, a working part configured to provide a predetermined service to a user, and a driving device for moving an own mobile object, in which the driving device drives the own mobile object to move in a movement mode determined by the mobile object control device.

(5) A learning device according to one aspect of the present invention is a simulator that executes a simulation of an operation of a mobile object and includes: a plurality of the simulators in which the number of existing mobile objects or obstacles is different for each of the simulators; and a learning part that learns a policy of the operation so that an accumulated sum of the rewards obtained by applying a reward function to each processing result of the plurality of the simulators is maximized.

(6) In the above aspect (5), the plurality of the simulators are executed by separate processors respectively associated with the plurality of simulators.

(7) In the above aspect (5) or (6), different maximum numbers of the mobile objects or the obstacles are set in the plurality of the simulators, and the plurality of the simulators execute the simulation while increasing the number of the mobile objects or the obstacles in a stepwise manner from a prescribed minimum number to the respective maximum number.

(8) In any one of the above aspects (5) to (7), the plurality of the simulators execute simulations in parallel for a plurality of environments in which the number of the mobile objects or the obstacles is the same in the simulation of each stage.

(9) In any one of the above aspects (5) to (8), the reward function includes, as a variable, at least one of an achievement degree of the mobile object to a target, a number of collisions of the mobile object, and a moving speed of the mobile object.

(10) In any one of the above aspects (5) to (9), the reward function includes, as an independent variable, a change in a movement vector of the mobile object or the obstacle existing around an own mobile object.

(11) A learning method according to one aspect of the present invention is a method that a computer executes a simulation of an operation of a mobile object by a plurality of simulators in which the number of existing mobile objects or obstacles are different for each of the simulators and learns a policy of the operation so that an accumulated sum of the rewards obtained by applying a reward function to each processing result of the plurality of the simulators is maximized.

(12) A storage medium according to one aspect of the present invention is a computer readable non-transitory storage medium configured to store a program causing a computer to execute a simulation of an operation of a mobile object by a plurality of simulators in which the number of existing mobile objects or obstacles is different for each of the simulators and configured to learn a policy of the operation so that an accumulated sum of the rewards obtained by applying a reward function to each processing result of the plurality of the simulators is maximized.

According to (1) to (4), an appropriate movement mode can be determined according to the congestion degree of the environment by including: a route determiner configured to determine a route of a mobile object according to the number of obstacles existing around the mobile object; and a controller configured to move the mobile object along the route determined by the route determiner.

According to (5) to (12), an appropriate movement mode can be determined according to a congestion degree of an environment by including a plurality of simulators that execute a simulation of an operation of a mobile object, in which the number of existing mobile objects or obstacles is different for each of the simulators; and a learning part that learns a policy of the operation such that an accumulated sum of the rewards obtained by applying a reward function to each processing result of the plurality of the simulators is maximized.

DESCRIPTION OF EMBODIMENTS

Hereinafter, embodiments of a mobile object control device, a mobile object, a learning device, a learning method, and a storage medium according to the present invention will be described with reference to the drawings.

First Embodiment

Figure 1:
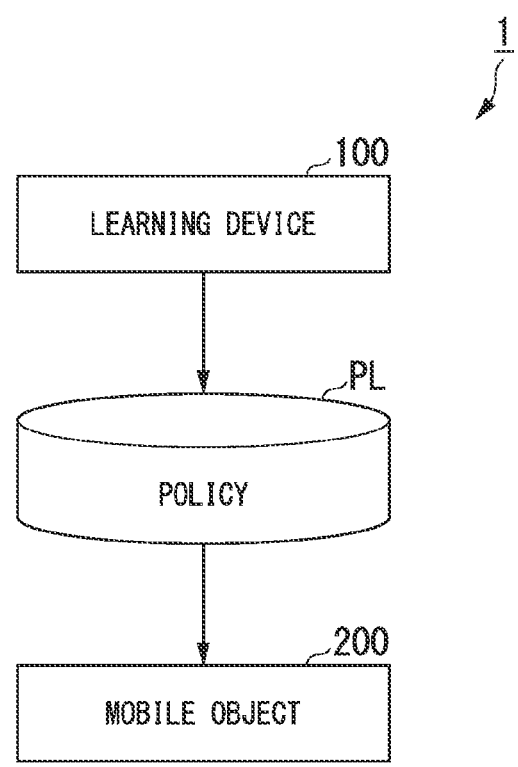
FIG. 1 is a schematic diagram of a configuration of a mobile object control system according to an embodiment.

FIG. 1 is a schematic diagram of a configuration of a mobile object control system 1 according to an embodiment. The mobile object control system 1 includes a learning device 100 and a mobile object 200. The learning device 100 is realized by one or more processors. The learning device 100 is a device configured to determine an action by computer simulation for a plurality of mobile objects, derives or acquires a reward based on a change in a state or the like caused by the action, and learns an action (operation) that maximizes the reward. The operation is, for example, movement in the simulation space. An operation other than movement may be a learning target, but in the following description, the operation is assumed to mean movement. The simulator configured to determine the movement may be executed in a device different from the learning device 100, but in the following description, the simulator is assumed to be executed by the learning device 100. The learning device 100 stores in advance environment information as a premise of simulation, such as map information. The learning result of the learning device 100 is mounted on the mobile object 200 as the policy PL.

[Learning Device]

Figure 2:
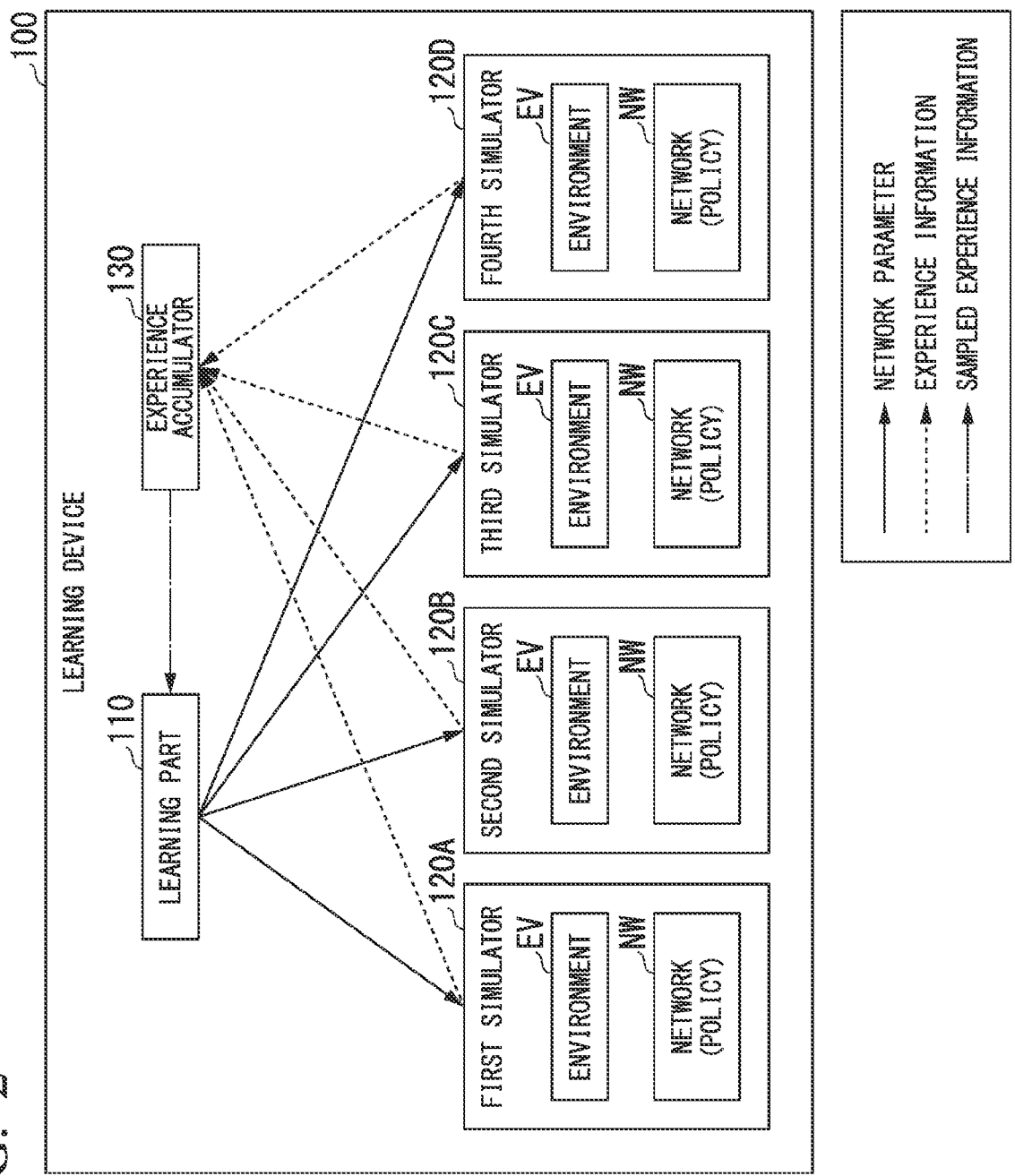
FIG. 2 is a diagram showing a configuration example of a learning device.

FIG. 2 is a diagram illustrating a configuration example of a learning device 100 according to an embodiment. The learning device 100 includes, for example, a learning part 110, a plurality of simulators 120, and an experience accumulator 130. These components are implemented by, for example, a hardware processor such as a central processing unit (CPU) executing a program (software). Some or all of these components may be implemented by a hardware (circuit part; including a circuitry) such as a large scale integration (LSI), an application specific integrated circuit (ASIC), a field-programmable gate array (FPGA), or a graphics processing unit (GPU), or may be implemented by software and hardware in cooperation. The program may be stored in advance in a storage device (a storage device including a non-transitory storage medium) such as a hard disk drive (HDD) or a flash memory, a solid state drive (SSD) or the like, or may be stored in a detachable storage medium (a non-transitory storage medium) such as a DVD or a CD-ROM and installed by inserting the storage medium into a drive device.

The learning part 110 updates the policy according to various reinforcement learning algorithms based on evaluation information indicating a result of evaluation of a state change generated by the plurality of simulators 120 by the experience accumulator 130. The learning part 110 repeatedly executes the output of the updated policy to the plurality of simulators 120 until learning is completed. The policy is, for example, a neural network (hereinafter, also simply referred to as a "network") having a parameter, and outputs an action (operation) that can be taken by the agent in response to the input of the environment information with probability. Here, the agent is a mobile object that exists in a simulation space (environment) and is a target mobile object to learn the operation. The agent is an example of the "own mobile object". The environment information is information indicating a state of the environment. The policy may be a rule based function having parameters. The learning part 110 updates the policy by updating the parameter based on the evaluation information. The learning part 110 supplies the updated parameters to each simulator 120.

The simulator 120 inputs an operation target and a current state (an initial state immediately after the start of simulation) to the policy and derives a state change that is a result of the operations of the own agent and another agent. The policy is, for example, a deep neural network (DNN), but may be a policy of other modes, such as a rule based policy. The policy derives an occurrence probability for each of a plurality of types of assumed operations. For example, in a simple example, assuming that the assumed plane spreads up, down, left, and right, results such as right movement 80%, left movement 10%, upward movement 10%, and downward movement 0% are output. The simulator 120 causes a random number to act on this result to derive a state change of the agent such as moving to the right when the random number value is greater than or equal to 0% and less than 80%, moving to the left when the random number value is greater than or equal to 80% and less than 90%, and moving up when the random number value is greater than or equal to 90%.

The plurality of simulators 120 use the policy (network) updated by the learning part 110 to execute simulation for an environment where the number of agents is different and a plurality of agents exist, thereby determining the operation of the agent in each environment. The determination of the operation referred to here is to derive the state change described above for the agent. In the present embodiment, for example, four simulators are assumed as the plurality of simulators 120. For example, in the present embodiment, it is assumed that the first to fourth simulators 120A to 120D determine movement of 2-agents, 4-agents, 8-agents, and 10-agents, respectively. The environment may include a mobile object that does not depend on a policy other than the agent. For example, in addition to the agent that moves based on the policy, the environment may include a mobile object that is stopped, a mobile object that operates in an operation model different from the policy, and the like.

Specifically, each simulator 120 updates the policy (network) with the parameters supplied from the learning part 110, inputs the current state obtained by the simulation result of the previous time (sampling period one before) to the updated network, and determines the current (current sampling period) operation of each agent by applying a random number to the output result. When each simulator 120 inputs the determined operation to the environment EV, the updated state and reward are generated by the environment EV. The reward is generated when the environment EV inputs the determined action to the reward function. Each simulator 120 supplies experience information based on the operation determined for each agent to the experience accumulator 130. For example, the experience information includes information on an action determined for the agent, a state before the action or a state after the action, and a reward obtained by the action.

The experience accumulator 130 accumulates the experience information supplied from each simulator 120, samples the experience information having a high priority from the accumulated experience information and supplies the experience information to the learning part 110. The priority is a priority based on a level of learning effect in the learning of the network NW, and is determined by, for example, a temporal difference (TD) error. The priority may be appropriately updated based on the learning result of the learning part 110.

The learning part 110 updates the parameters of the network NW based on the experience information supplied from the experience accumulator 130 so that the reward obtained by the movement of each agent is maximized. The learning part 110 supplies the updated parameters to each simulator 120. Each simulator 120 updates the network NW with the parameters supplied from the learning part 110.

The learning part 110 may use any of various reinforcement learning algorithms. The learning part 110 learns appropriate movement of an agent in an environment where a plurality of agents exist by repeatedly executing such parameter update. The network thus learned is supplied to the mobile object 200 as a policy.

The reward function used when the environment EV calculates the reward may be any function as long as the reward function gives a larger reward as the agent moves more appropriately. For example, as shown in equation (1), a function R including a reward function $R_1$ given when the own agent arrives at the destination, a reward function $R_2$ given when the own agent achieves smooth movement, a reward function $R_3$ that decreases when the own agent causes a change in a movement vector of another agent, and a reward function $R_4$ that makes a distance to be held when the own agent approaches another agent variable according to a direction in which another agent faces may be adopted as the reward function. The reward function R may be a function including at least one of $R_1$, $R_2$, $R_3$, and $R_4$.

$$R=R_1+R_2+R_3+R_4 \qquad [\text{Equation 1}]$$

For example, the reward function $R_1$ is a function that has a positive fixed value in a case where the vehicle has reached the destination and has a value (positive if distance change is in decreasing direction, negative if distance change is in increasing direction) proportional to a distance change to the destination in a case where the vehicle has not reached the destination. The reward function $R_1$ is an example of a "first function".

For example, the reward function $R_2$ is a function having a larger value the smaller the third differentiation, that is, jerk (jerk) of the position of the agent in the two-dimensional plane. The reward function $R_2$ is an example of a "second function".

For example, the reward function $R_3$ is a function that returns a low evaluation value when the own agent enters a predetermined region. According to such a reward function $R_3$, for example, it is possible to give a low evaluation to an action in which the own agent passes through a region (predetermined region) in front of the other agent, and a not-too low evaluation to an action in which the own agent passes through the side or the back. The reward function $R_3$ is an example of a "third function".

Figure 3:
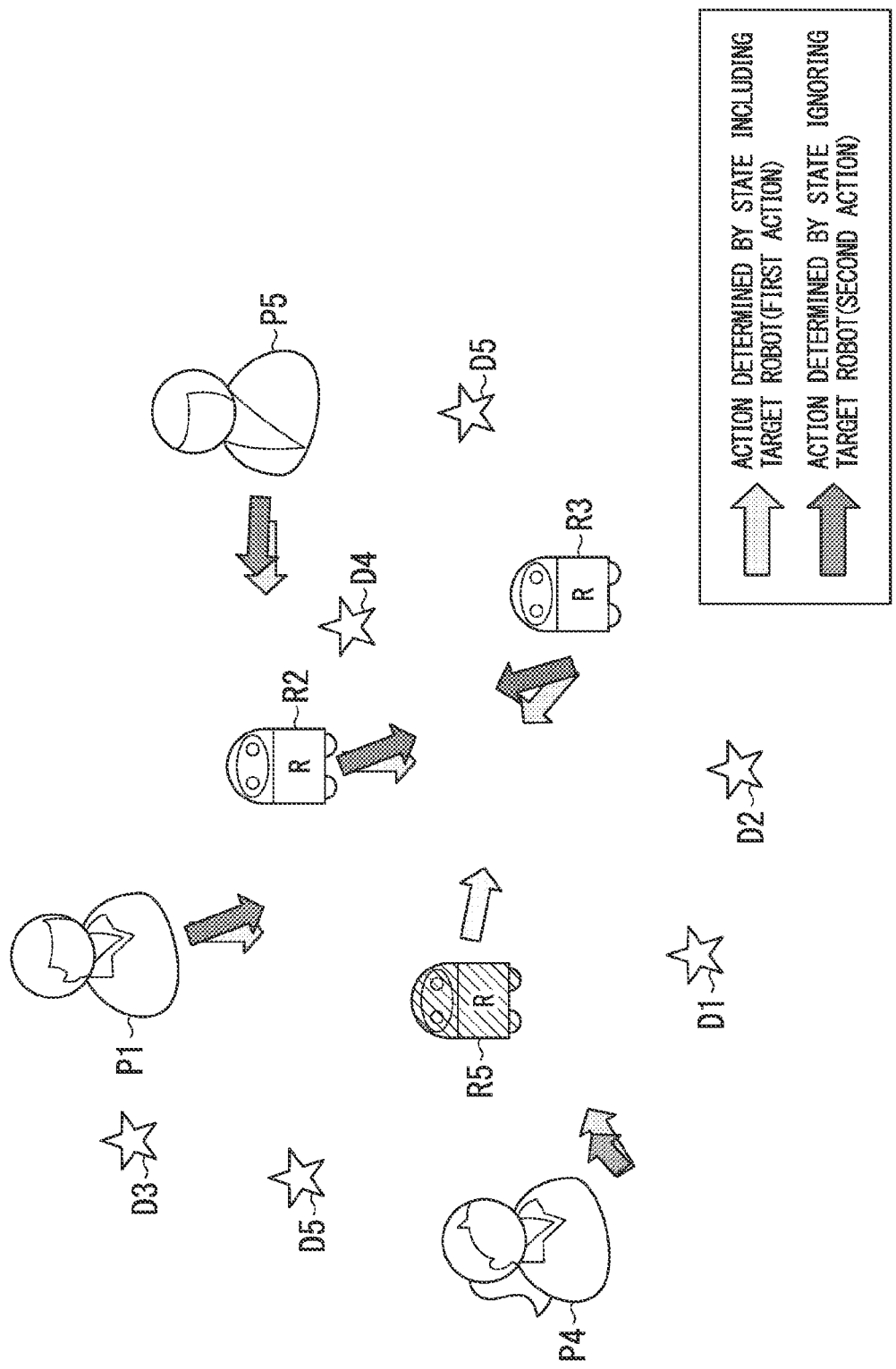
FIG. 3 is a diagram describing a reward function $R_4$.

FIG. 3 is a diagram describing a reward function $R_4$. FIG. 3 illustrates an environment where the persons P1, P4, and P5 and the robots R2, R3, and R5 coexist as an example of the simulation environment. In FIG. 3, points D1 to D5 are target points of the respective mobile objects. Specifically, the point D1 is a target point of the person P1, the point D2 is a target point of the robot R2, the point D3 is a target point of the robot R3, the point D4 is a target point of the person P4, and the point D5 is a target point of the person P5.

Here, with the robot R5 defined as a target robot, the reward function $R_4$ for causing the target robot to learn a movement method that does not obstruct movement of a person can be defined as, for example, the following equation (2).

[Equation 2]

$$R_4 = w \sum_{i=1}^{N} \|a_i - b_i\| \quad (2)$$

In equation (2), $R_4$ is a reward function for causing a movement method that does not obstruct movement of a person to be learned and is a function that gives a larger reward as the movement does not obstruct the movement of a person. "i" is an identification number of a mobile object such as a person or a robot existing in the environment, and N is a maximum number thereof. "$a_i$" represents an action (hereinafter, referred to as "first action") determined by the state of the environment including the target robot R5 for each mobile object, and $b_i$ represents an action (hereinafter referred to as "second action") determined by the state of the environment not including (in a case of ignoring) the target robot R5. "w" is a coefficient that takes a difference between the first action and the second action for each mobile object and converts a value corresponding to the sum into a negative reward value as a penalty. That is, equation (2) calculates a reward that becomes smaller as the difference between the first action and the second action increases. According to such a reward function, for example, the target robot R5 can learn a movement method in which its own action does not affect the movement of other mobile objects. The reward function $R_4$ is an example of a "fourth function".

The learning operation of the network described above is an operation when each simulator 120 performs simulation with a predetermined number of agents. The learning device 100 of the present embodiment is configured to execute the reinforcement learning described above while gradually increasing the number of agents in the simulation, thereby learning the operation of the mobile object in a plurality of environments having different numbers of agents in parallel. This method of learning the policy of the environment of the final number of agents while gradually increasing the number of agents (hereinafter referred to as "stepwise reinforcement learning") is known as one of the methods for improving the accuracy of reinforcement learning (see e.g., above described Document 1).

Figure 4:
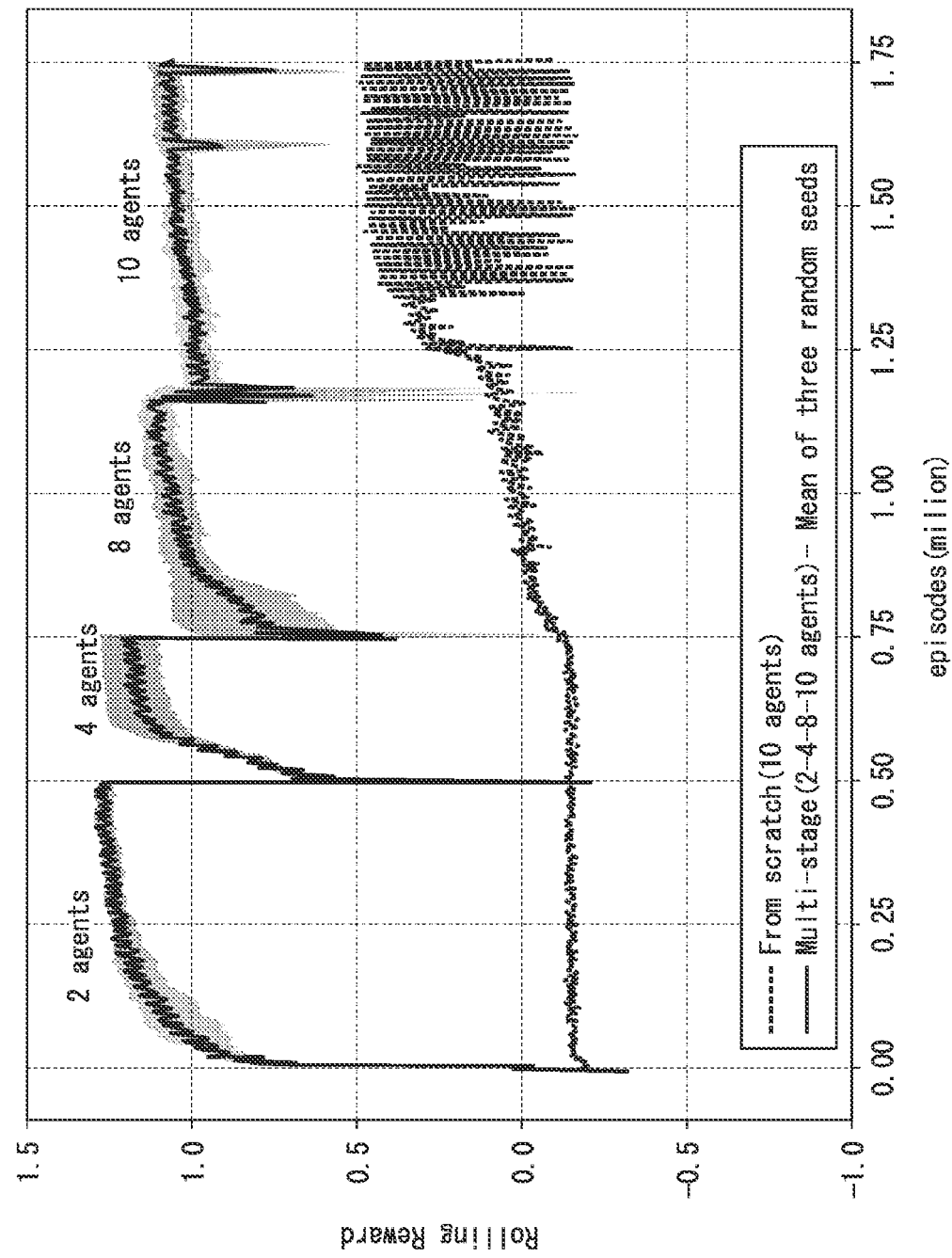
FIG. 4 is a diagram illustrating an example of an effect of stepwise reinforcement learning.

FIG. 4 is a diagram illustrating an example of an effect of stepwise reinforcement learning. In FIG. 4, the horizontal axis represents the degree of progress of learning in each stage, and the vertical axis represents the accuracy of learning. According to FIG. 4, the operation of obtaining a higher reward can be learned by performing learning while increasing the number of agents in a stepwise manner of 2, 4, 8, and 10 rather than performing learning with 10-agents from the beginning.

However, in an environment where a plurality of agents exist, the policy learned by the 10-agents does not necessarily determine the appropriate movement in all environments. This is because, in the learning of movement, although priority is given to determining a movement destination that does not come in contact with another mobile object, an obstacle, or the like (that is, learning as an operation that can obtain a high reward), the priority of other matters may become higher depending on the state of the environment (e.g., the density of agents existing in the environment). That is, a learning result of the movement in an environment with a larger number of agents may be over-learned in determining the movement in an environment with a smaller number of agents.

Figure 5:
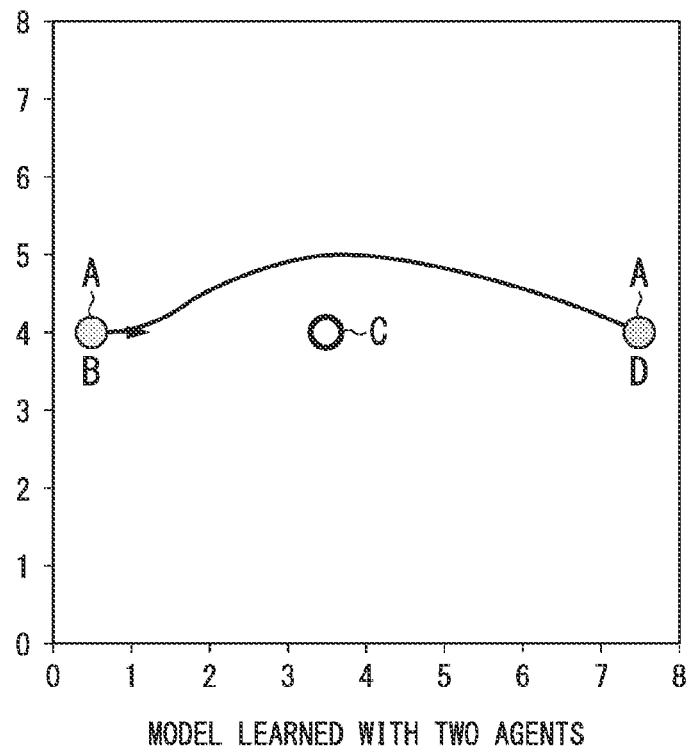
FIG. 5 is a first diagram illustrating an example of over-learning of a network.
Figure 6:
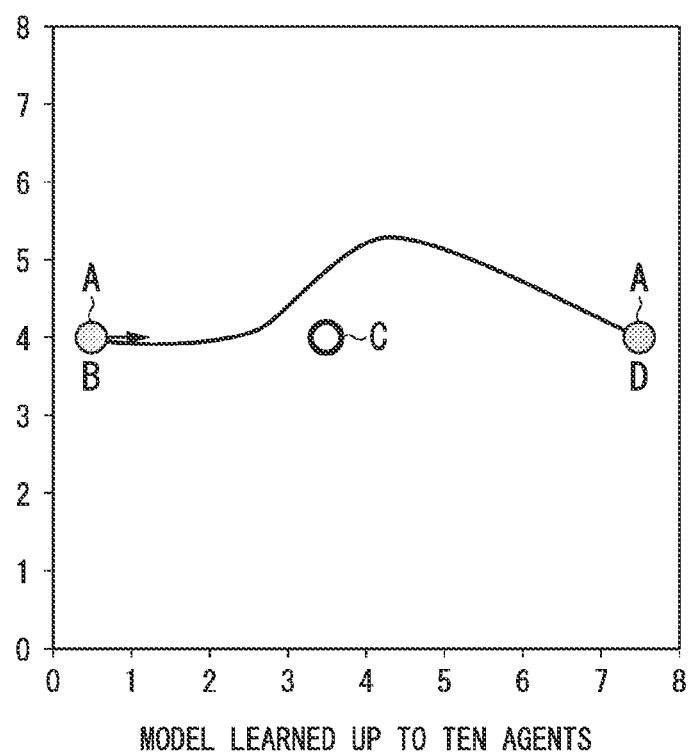
FIG. 6 is a second diagram illustrating an example of over-learning of a network.

FIGS. 5 and 6 are diagrams illustrating an example of over-learning of a policy. FIG. 5 illustrates an example of movement based on a policy learned by 2-agents, and FIG. 6 illustrates an example of movement based on a policy learned by 10-agents. FIGS. 5 and 6 each illustrate a moving route determined for one agent A to depart from a departure point B and arrive at a destination D while avoiding an obstacle C. From FIGS. 5 and 6, in the policy learned in the 2-agent environment, the agent A immediately starts the avoidance behavior of the obstacle C after leaving the departure point B, whereas in the policy learned in the 10-agent environment, the agent A starts the avoidance behavior at a position closer to the obstacle C.

Such a difference in the avoidance behavior can be considered as, for example, a result of learning that the avoidance behavior is started at a position closer to the obstacle C so as not to interfere with other agents since an environment with a larger number of agents is more likely to interfere with other agents. For example, such a difference in the avoidance behavior can be considered as a result of learning to change the advancing direction more gently in order to improve the safety of movement since the environment with a smaller number of agents is less likely to interfere with other agents.

In any case, in the conventional stepwise reinforcement learning, in a case where learning is sequentially and individually performed from an environment with a small number of agents to an environment with a large number of agents, a learning result by the last learning environment becomes dominant in the determination of a movement mode by a policy. Therefore, even if movement in an environment where many agents exist can be accurately learned, a policy generated by such learning will be optimized for an environment where many agents exist, and an appropriate action may not be determined in an environment with a different number of agents. Thus, the learning device 100 according to the present embodiment is configured to operate the plurality of simulators 120 in parallel to learn environments having different number of agents in parallel.

Figure 7:
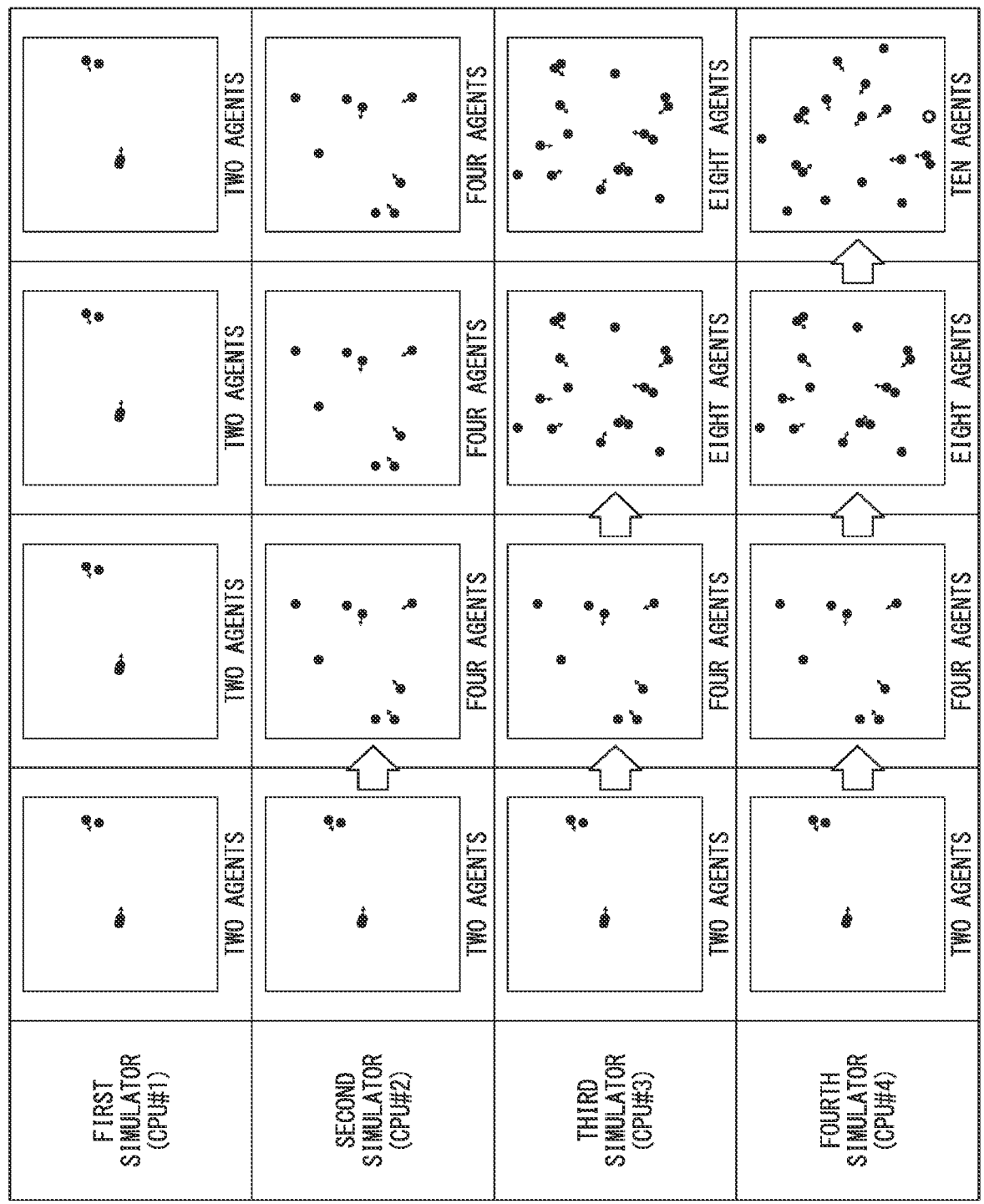
FIG. 7 is a diagram illustrating a state in which the learning device learns an operation for an environment where the number of agents is different using a plurality of simulators.

FIG. 7 is a diagram illustrating a state in which the learning device 100 learns an operation for an environment where the number of agents is different using a plurality of simulators 120. As described above, in the learning device 100 of the present embodiment, the simulators 120A, 120B, 120C, and 120D determine the operation of each agent for the environment where 2-agents, 4-agents, 8-agents, and 10-agents exist, respectively. Specifically, each simulator 120 starts simulation with a prescribed minimum number of agents and executes simulation while gradually increasing the number of agents up to the maximum number of each simulator 120.

For example, in the present embodiment, since the maximum number of agents is four, the simulator 120B first starts simulation with 2-agents and proceeds to simulation with 4-agents when learning with 2-agents has progressed to some extent. Similarly, since the maximum number of agents is 8, the simulator 120C first starts simulation with 2-agents, proceeds to simulation with 4-agents when learning with 2-agents has progressed to some extent, and proceeds to simulation with 8-agents when learning with 4-agents has progressed to some extent. Similarly, since the maximum number of agents is 10, the simulator 120D first starts simulation with 2-agents, proceeds to simulation with 4-agents when learning with 2-agents has progressed to some extent, proceeds to simulation with 8-agents when learning with 4-agents has progressed to some extent, and proceeds to simulation with 10-agents when learning with 8-agents has progressed to some extent. When the number of agents reaches the maximum number, the simulators 120B, 120C, and 120D continue the simulation with the maximum number until the end of learning. Since the maximum number of agents is two, the simulator 120A executes simulation with 2-agents from the beginning to the end of learning.

In FIG. 7, for the sake of simplicity, the environment of the same number of agents is represented in the same state in each learning stage, but this means that simulation of the environment of the same number of agents is executed in successive learning stages and does not mean that exactly the same simulation is repeatedly executed. In each simulator, the fact that the simulation of the environment of the same number of agents is represented for each learning stage means that the simulation of the same number of agents is performed in successive learning stages and does not necessarily mean that the start and end of the simulation are performed for each learning stage. In a case where the number of agents does not change, the start and end of the simulation may be performed for each learning stage or may be continuously performed in successive learning stages.

According to such a configuration, learning of environments having different number of agents can be thoroughly advanced, and thus it is possible to flexibly cope with environments having any number of agents. That is, by using the policy learned by such a method, the mobile object control device 250 can control the mobile object 200 so that the mobile object 200 moves in an appropriate mode according to the number of surrounding mobile objects. By using the policy learned by such a method, the movement controller 252 of the mobile object control device 250 can determine the route of the mobile object 200 according to the number of obstacles existing around the mobile object 200. The movement controller 252 is an example of a "route determiner".

Specifically, a different maximum number of agents is set in advance in each simulator 120, and each simulator 120 executes simulation while increasing the number of agents in a stepwise manner from a small number of agents to the respective maximum number of agents. The learning device 100 may be configured to allocate the calculation resources to each simulator 120 in a time division manner or may be configured to allocate the calculation resources that can be used by each simulator 120 in parallel. For example, the learning device 100 may include a CPU of a number greater than or equal to the number of simulators 120 and may be configured to allocate separate CPUs as a calculation resource to each simulator 120. FIG. 7 illustrates an example in which the first to fourth CPUs #1 to #4 are allocated to the simulators 120A to 120D. The calculation resource allocated to each simulator 120 may be a physical core unit of the CPU or a virtual core unit realized by a technology such as Simultaneous Multithreading Technology (SMT).

According to the learning device 100 described above, the learning of the operation of the agent by the reinforcement learning can be performed in parallel in a distributed manner in the plurality of simulators 120 corresponding to each environment where the number of agents is different. As a result, the mobile object control device 250 to which the policy which is the learning result of the learning device 100 is applied can determine an appropriate movement mode according to the congestion degree of the environment.

[Mobile Object]

Figure 8:
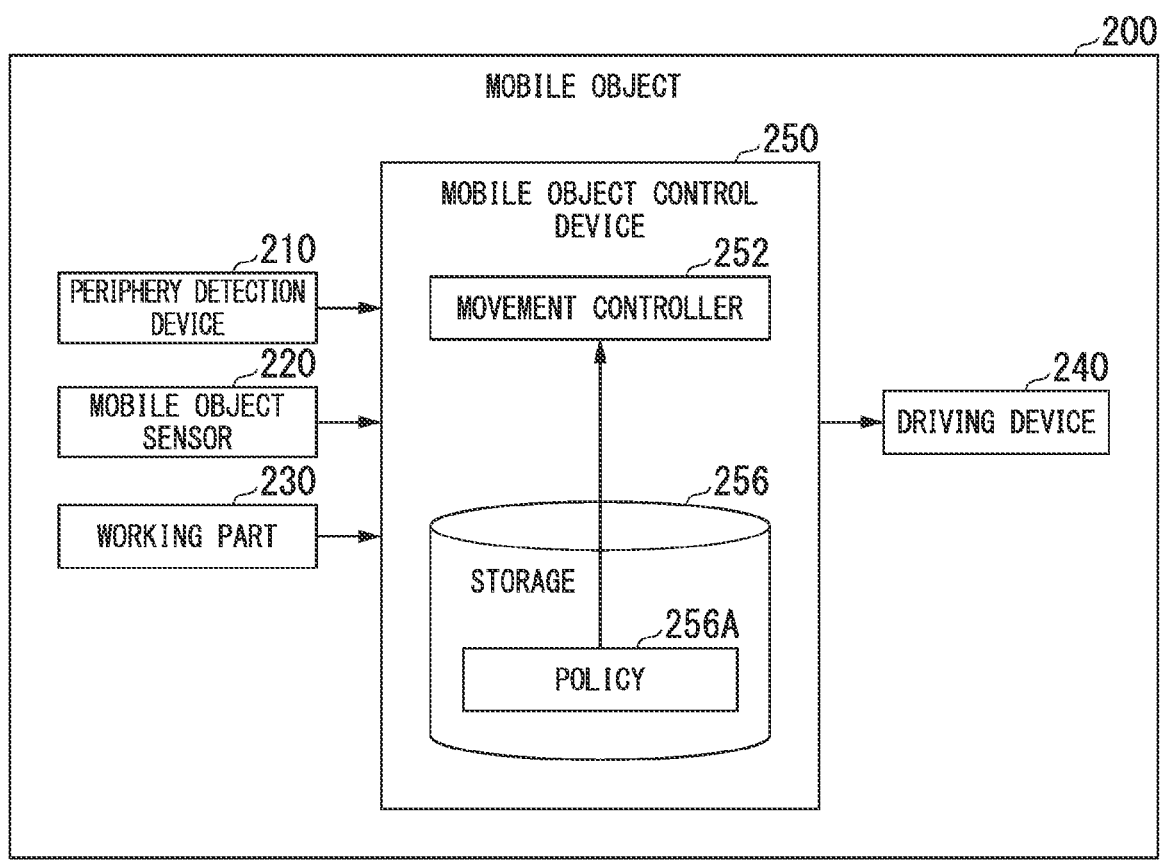
FIG. 8 is a diagram illustrating a configuration example of the mobile object.

FIG. 8 is a diagram illustrating a configuration example of the mobile object 200. The mobile object 200 includes, for example, a mobile object control device 250, a periphery detection device 210, a mobile object sensor 220, a working part 230, and a driving device 240. The mobile object 200 may be a vehicle or a device such as a robot. The mobile object control device 250, the periphery detection device 210, the mobile object sensor 220, the working part 230, and the driving device 240 are connected to each other by a multiplex communication line such as a controller area network (CAN) communication line, a serial communication line, a wireless communication network, or the like.

The periphery detection device 210 is a device for detecting an environment around the mobile object 200 or an operation of another mobile object in the periphery. The periphery detection device 210 includes, for example, a position measuring device including a GPS receiver, map information, and the like, and an object recognition device such as a radar device and a camera. The position measuring device measures the position of the mobile object 200 and matches the position with the map information. The radar device emits a radio wave such as a millimeter wave to the area around the mobile object 200 and detects a radio wave (reflected wave) reflected by an object to detect at least the position (distance and azimuth) of the object. The radar device may detect a position and a movement vector of the object. The camera is, for example, a digital camera using a solid-state imaging element such as a charge coupled device (CCD) or a complementary metal oxide semiconductor (CMOS) and is provided with an image processing device for recognizing the position of the object from the imaged image. The periphery detection device 210 outputs, to the mobile object control device 250, information such as a position of the mobile object 200 on a map and a position of an object existing around the mobile object 200 (including another mobile object corresponding to another agent described above).

The mobile object sensor 220 includes a speed sensor that detects the speed of the mobile object 200, an acceleration sensor that detects acceleration, a yaw rate sensor that detects an angular velocity around a vertical axis, an azimuth sensor that detects an orientation of the mobile object 200, and the like. The mobile object sensor 220 outputs the detected result to the mobile object control device 250.

The working part 230 is, for example, a device configured to provide a predetermined service to the user. Here, the service is, for example, work such as loading or unloading cargo or the like onto or from transportation equipment. The working part 230 includes, for example, a magic arm, a loading platform, a human machine interface (HMI) such as a microphone and a speaker, and the like. The working part 230 operates according to the content instructed from the mobile object control device 250.

The driving device 240 is a device for moving the mobile object 200 in a desired direction. In a case where the mobile object 200 is a robot, the driving device 240 includes, for example, two or more legs and actuators. In a case where the mobile object 200 is a vehicle, a micro mobile, or a robot that moves by wheels, the driving device 240 includes wheels (steering wheel, drive wheel), a motor for rotating the wheels, an engine, and the like.

The mobile object control device 250 includes a movement controller 252 and a storage 256. The movement controller 252 is realized, for example, by a hardware processor such as a CPU executing a program (software). The program may be stored in advance in a storage device (non-transitory storage medium) such as an HDD or a flash memory or may be stored in a detachable storage medium (a non-transitory storage medium) such as a DVD or a CD-ROM and installed by inserting the storage medium into a drive device. Some or all of these components may be implemented by a hardware (circuit part; including circuitry) such as LSI an ASIC, a FPGA, a GPU or the like, or may be implemented software and hardware in cooperation.

The storage 256 is, for example, an HDD, a flash memory, a RAM, a ROM, or the like. The storage 256 stores, for example, information such as the policy 256A. The policy 256A is the policy PL generated by the learning device 100 and is based on the policy at the final point of the processing in the learning stage.

For example, the movement controller 252 inputs information such as the position of the mobile object 200 on the map and the position of the object existing around the mobile object 200 detected by the periphery detection device 210 and information of the destination input by the user to the policy 256A, thereby determining the position (movement mode) where the mobile object 200 should proceed next, and outputs the determined position to the driving device 240. The route of the mobile object 200 is sequentially determined by this repetition.

According to the mobile object control device 250 described above, a predetermined service can be provided to the user while moving the mobile object 200 in a mode corresponding to the congestion degree of the environment by applying the policy which is the learning result of the learning device 100 of the embodiment.

Second Embodiment

Similarly to the mobile object control system 1 of the first embodiment, in a mobile object control system 1 of the second embodiment, a learning device 100 simulates movement of an agent in an environment where the number of agents is different by a plurality of simulators 120, an experience accumulator 130 generates evaluation information based on a simulation result, and a learning part 110 updates a parameter of a network based on the evaluation information.

On the other hand, in the mobile object control system 1 of the first embodiment, each simulator 120 executes the stepwise reinforcement learning in one environment in the learning device 100 (see FIG. 7), but the mobile object control system 1 of the second embodiment is different from the learning device 100 of the first embodiment in that each simulator 120 executes the simulation in each learning stage in a plurality of environments where the number of agents is the same. Other configurations are similar to those of the mobile object control system 1 of the first embodiment (see FIGS. 1, 2, 7, etc.).

Figure 9:
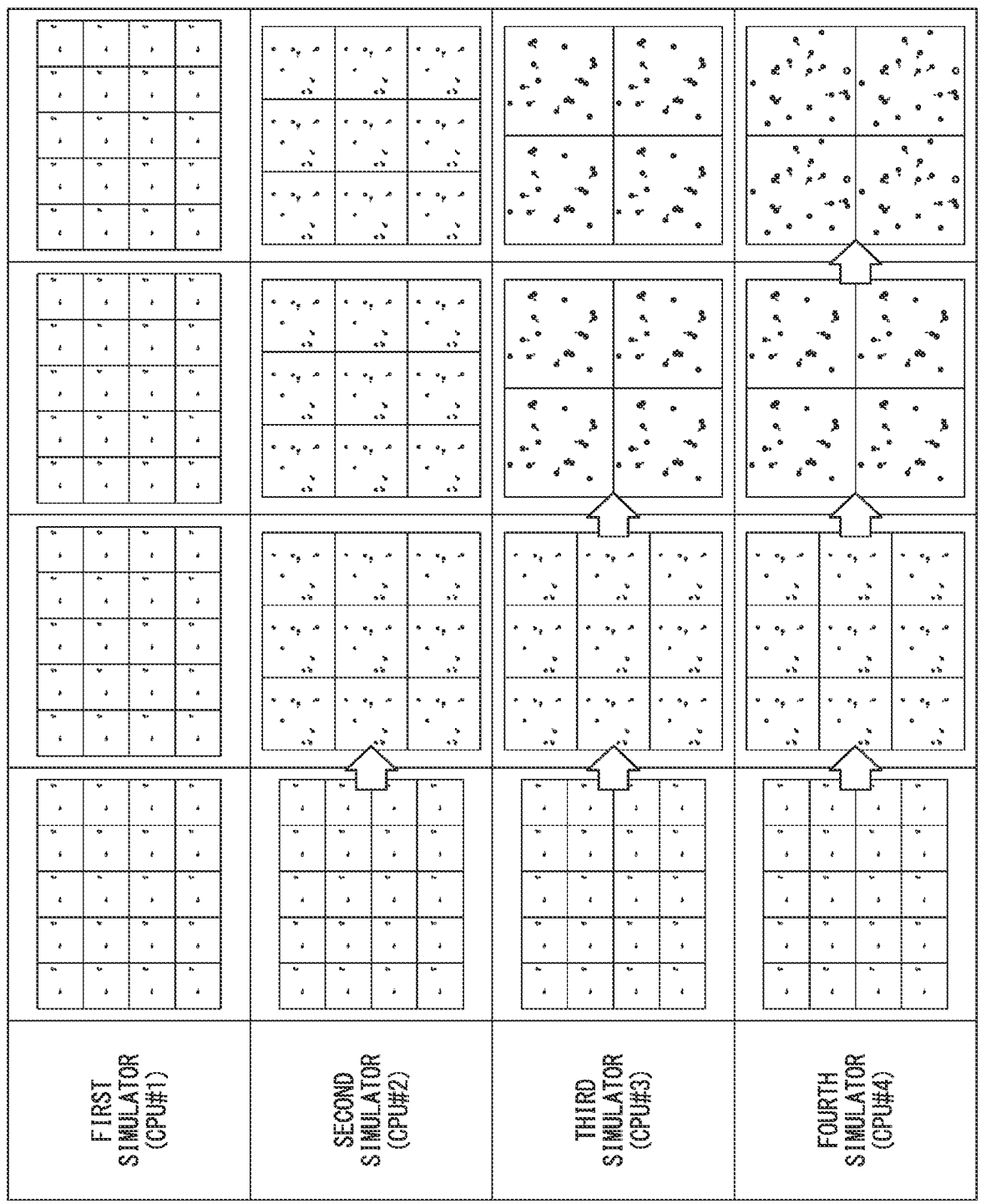
FIG. 9 is an image diagram illustrating a state in which a plurality of simulators execute simulation in a plurality of environments in which the number of agents is the same in the learning device.

FIG. 9 is an image diagram illustrating a state in which a plurality of simulators 120 execute simulation in a plurality of environments where the number of agents is the same in the learning device 100 of the second embodiment. In the second embodiment as well, similarly to the first embodiment, different CPUs are assigned to each simulator 120 as calculation resources that can be used at the same time. For example, FIG. 9 illustrates an example for a case where the maximum value (hereinafter referred to as "maximum parallel number") of the number of agents that can be simultaneously calculated in parallel by one CPU is 40.

Here, since the maximum number of agents is set to two, the first simulator 120A always executes simulation in 2-agent environments from the first stage to the fourth stage. In this case, since the maximum parallel number per CPU is 40, the first simulator 120A executes simulation in parallel for 20 2-agent environments.

Similarly, since the maximum number of agents is set to four, the second simulator 120B first executes simulation in a 2-agent environment in the first stage, proceeds to simulation in a 4-agent environment with the maximum number of agents in the second stage, and executes simulation in a 4-agent environment in the second to fourth stages. In this case, since the maximum number of agents per CPU is 40, the second simulator 120B executes simulation for 20 2-agent environments in parallel in the first stage, similarly to the first simulator 120A, and executes simulation for 9 4-agent environments in parallel in the second to fourth stages. Here, 9 (=3×3) 4-agent environments (the total number of agents is 36=9×4<40) are illustrated in order to make it easy to grasp an image, but the second simulator 120B may be configured to execute simulation in parallel for 10 4-agent environments which is the maximum parallel number.

Similarly, since the maximum number of agents is set to eight, the third simulator 120C first executes simulation in a 2-agent environment in the first stage, proceeds to simulation in a 4-agent environment in the second stage, proceeds to simulation in an 8-agent environment with the maximum number of agents in the third stage, and executes simulation in an 8-agent environment in the third to fourth stages. In this case, since the maximum number of agents per CPU is 40, the third simulator 120C executes simulation for 20 2-agent environments in parallel in the first stage, similarly to the first simulator 120A, executes simulation for 10 4-agent environments in parallel in the second stage, similarly to the second simulator 120B, and executes simulation in 4 8-agent environments in parallel in the third to fourth stages. Here, 4 (=2×2) 8-agent environments (the total number of agents is 32=8×4<40) are illustrated in order to make it easy to grasp an image, but the third simulator 120C may be configured to execute simulation in parallel for 5 8-agent environments which is the maximum parallel number.

Similarly, since the maximum number of agents is set to ten, the fourth simulator 120D first executes simulation in a 2-agent environment in the first stage, proceeds to simulation in a 4-agent environment in the second stage, proceeds to simulation in an 8-agent environment in the third stage, and proceeds to simulation in a 10-agent environment with the maximum number of agents in the fourth stage. In this case, since the maximum number of agents per CPU is 40, the fourth simulator 120D executes simulation for 20 2-agent environments in parallel in the first stage, similarly to the first simulator 120A, executes simulation for 9 4-agent environments in parallel in the second stage, similarly to the second simulator 120B, executes simulation in 4 8-agent environments in parallel in the third stage, similarly to the third simulator 120C, and executes simulation in 4 10-agent environments in parallel in the fourth stage.

In FIG. 9, in each learning stage, the number of agents in a plurality of environments generated by each CPU is unified, but this is not essential, and the number of agents does not need to be unified in a plurality of environments as long as the number does not exceed the maximum parallel number and is suitable for a stepwise increase in the number of agents. For example, at the final stage of learning, the number of mobile objects in each environment may be set to two in the CPU #1, to two to six (the number of mobile objects is reduced to increase the number of environments) in the CPU #2, to two to six (the number of mobile objects is increased to reduce the number of environments) in the CPU #3, and to two to ten (the number of mobile objects is increased to reduce the number of environments) in the CPU #4.

In FIG. 9, for the sake of simplicity, a plurality of environments of the same number of agents are represented in the same state in each learning stage, but this means that simulation of the environment of the same number of agents is executed at the same time and does not mean that exactly the same simulation is repeatedly executed.

Similarly to FIG. 7, in FIG. 9, for the sake of simplicity, the environment of the same number of agents is represented in the same state in each learning stage, but this means that simulation of the environment of the same number of agents is executed in successive learning stages, and does not mean that exactly the same simulation is repeatedly executed. In each simulator, the fact that the simulation of the environment of the same number of agents is represented for each learning stage means that the simulation of the same number of agents is performed in successive learning stages and does not necessarily mean that the start and end of the simulation are performed for each learning stage. In a case where the number of agents does not change, the start and end of the simulation may be performed for each learning stage or may be continuously performed in successive learning stages.

In the mobile object control system 1 of the second embodiment configured as described above, the learning device 100 can execute simulations in parallel for a plurality of environments in which the number of agents is the same. With such a configuration, the mobile object control system 1 according to the embodiment can efficiently learn the movement of each agent in an environment where a plurality of agents exist.

In the mobile object control system 1 of the second embodiment, each of the simulators for each of the plurality of CPUs virtually forms a plurality of environments, the total value of the mobile objects for each of the CPUs is unified by the plurality of CPUs, and the number of agents corresponding to the number of environments is generated in each environment. According to such a configuration, the mobile object control system 1 according to the embodiment can prevent a bias for each CPU from appearing in the collected experience and can more efficiently learn the movement of each agent.

In the present embodiment, it is assumed that the update of the policy is performed only in the learning stage and is not performed after being mounted on the mobile object, but the learning may be continued even after being mounted on the mobile object.

While the modes for carrying out the present invention have been described above using the embodiment, the present invention is not limited to the embodiment described above, and various modifications and substitutions are possible without departing from the gist of the present invention.

What is claimed is:

1. A mobile object control device comprising:
a storage device configured to store a program; and
a hardware processor, wherein
the hardware processor executes the program stored in the storage device to,
determine a route of the mobile object according to number of obstacles existing around the mobile object, and
move the mobile object along the determined route, wherein
the hardware processor
determines a route of the mobile object based on a policy of an operation learned by a plurality of simulators and a learning part; and
the policy of the operation is
learned by the plurality of simulators simultaneously executing a simulation in parallel, and
the learning part updating parameters of the policy so as to maximize a reward obtained by applying a reward function to each result of the simulation of the plurality of the simulators,
wherein each of the plurality of the simulators is executing the simulation of an operation of the mobile object and the obstacles for a corresponding environment among a plurality of environments, each environment having different numbers of obstacles as compared to one another.

2. The mobile object control device according to claim 1, wherein
the policy of the operation is
learned based on processing results of a plurality of the simulators,
the number of obstacles in the environment is different for each of the plurality of the simulators, and
the learning part learns by updating the policy of the operation so that an accumulated sum of the rewards obtained by applying a reward function to each processing result of the plurality of the simulators is maximized.

3. A mobile object comprising:
the mobile object control device according to claim 2;
a working part configured to provide a predetermined service to a user; and
a driving device configured to move an own mobile object, wherein
the driving device drives the own mobile object to move in a movement mode determined by the mobile object control device.

4. A mobile object comprising:
the mobile object control device according to claim 1;
a working part configured to provide a predetermined service to a user; and
a driving device configured to move an own mobile object, wherein
the driving device drives the own mobile object to move in a movement mode determined by the mobile object control device.

5. A learning device comprising:
a storage device configured to store a program; and
a hardware processor, wherein the hardware processor executes the program stored in the storage device to, generate a plurality of simulators, allow the plurality of simulators to simultaneously that execute a simulation in parallel, and learn a policy of the operation by updating parameters of the policy so as to maximize such that an accumulated sum of rewards obtained by applying a reward function to each result of the simulation of the plurality of the simulators, wherein each of the plurality of the simulators is executing the simulation of an operation of the mobile object and the obstacles for a corresponding environment among a plurality of environments, each environment having different numbers of obstacles as compared to one another.

6. The learning device according to claim 5, wherein the plurality of the simulators are executed by separate hardware processors respectively associated with the plurality of simulators.

7. The learning device according to claim 5, wherein the plurality of the simulators are set with different maximum numbers of the mobile objects or the obstacles, and the plurality of the simulators execute the simulation while increasing the number of the mobile objects or the obstacles in a stepwise manner from a prescribed minimum number to the respective maximum number.

8. The learning device according to claim 5, wherein the plurality of the simulators execute simulations in parallel for a plurality of environments in which the number of the mobile objects or the obstacles is the same in the simulation of each stage.

9. The learning device according to claim 5, wherein the reward function includes, as a variable, at least one of an achievement degree of the mobile object to a target, a number of collisions of the mobile object, and a moving speed of the mobile object.

10. The learning device according to claim 5, wherein the reward function includes, as an independent variable, a change in a movement vector of the mobile object or the obstacle existing around an own mobile object.

11. A learning method, wherein a computer generates a plurality of simulators, allows the plurality of simulators to simultaneously execute a simulation in parallel, and learns a policy of the operation by updating parameters of the policy so as to maximize an accumulated sum of rewards obtained by applying a reward function to each result of the simulation of the plurality of the simulators, wherein each of the plurality of the simulators is executing the simulation of an operation of the mobile object and the obstacles for a corresponding environment among a plurality of environments, each environment having different numbers of obstacles as compared to one another.

12. A computer readable non-transitory storage medium configured to store a program causing a computer to generate a plurality of simulators;

allow the plurality of simulators to simultaneously execute a simulation in parallel, and to learn a policy of the operation by updating parameters of the policy so as to maximize an accumulated sum of the rewards obtained by applying a reward function to each result of the simulation of the plurality of the simulators, wherein each of the plurality of the simulators is executing the simulation of an operation of the mobile object and the obstacles for a corresponding environment among a plurality of environments, each environment having different numbers of obstacles as compared to one another.

\* \* \* \* \*